United States Patent Office 3,657,230
Patented Apr. 18, 1972

3,657,230
α-(TERT. AMINOPHENYL)-ALIPHATIC ACIDS
Richard William James Carney, New Providence, and George de Stevens, Woodland Park, Summit, N.J., assignors to Ciba Corporation, Summit, N.J.
No Drawing. Continuation-in-part of application Ser. No. 716,347, Mar. 27, 1968. This application Sept. 3, 1968, Ser. No. 757,136
Int. Cl. C07d 41/04, 27/02
U.S. Cl. 260—239 BF   10 Claims

ABSTRACT OF THE DISCLOSURE

New α-(tert. aminophenyl)-aliphatic acids, e.g. those of the formula

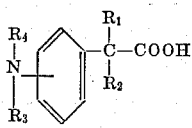

$R_1$=H or alkyl
$R_2$=H, alk(en)yl, cycloalk(en)yl or cycloalk(en)yl-alkyl
$R_3$=alk(en)yl, hydroxyalkyl or alkoxyalkyl
$R_4$=cycloalk(en)yl, cycloalk(en)yl-alkyl or aralkyl
$R_3+R_4$=alk(en)ylene, aza-, oxa- or thia-alkylene and functional derivatives thereof, are anti-inflammatory agents.

CROSS-REFERENCES TO RELATED APPLICATIONS

This is a continuation-in-part of application Ser. No. 716,347 filed Mar. 27, 1968, and now abandoned.

SUMMARY OF THE INVENTION

The present invention concerns and has for its object the provision of new α-(tert. aminophenyl)-ailphatic acids of the Formula I

in which $R_1$ is hydrogen or lower alkyl, $R_2$ is hydrogen, lower alkyl, alkenyl, cycoalkyl, cycloalkenyl, cycoalkyl-alkyl or cycloalkenyl-alkyl, Ph is a phenylene radical, $R_3$ is lower alkyl, alkenyl, hydroxyalkyl or alkoxyalkyl and $R_4$ is lower cycloalkyl, cycloalkenyl, cycloalkyl-alkyl, cycloalkenyl-alkyl or aralkyl, or $R_3$ and $R_4$, when taken together, represent lower alkylene, alkenylene or aza-, oxa- or thialkylene, wherein 2 heteroatoms in

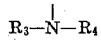

are separated by at least 2 carbon atoms, of their functional derivatives, as well as of corresponding pharmaceutical compositions and of the methods for the preparation and application of these products. Said compositions are useful anti-inflammatory agents in the treatment or management of arthrittic and dermatopathologic conditions.

DESCRIPTION OF THE PREFERRED EMBODIMENT

The lower alkyl radicals $R_1$, $R_2$ or $R_3$ represent, for example, methyl, ethyl, n- or i-propyl, -butyl, -pentyl, -hexyl or -heptyl. A lower alkenyl radical $R_2$ or $R_3$ is, for example, vinyl, allyl, methallyl, 3-butenyl or 1-pentenyl. The term "lower," referred to above and hereinafter in connection with organic radicals or compounds respectively, defines such with up to 7, preferably up to 4, carbon atoms. A cycloalkyl or cycloalkenyl radical $R_2$ or $R_4$ is 3 to 7 ring-membered and unsubstituted or substituted by lower alkyl, such as cyclopropyl, 1- or 2-methyl-cyclopropyl, 1,2-, 2,2- or 2,3-dimethyl-cyclopropyl, 1,2,2- or 1,2,3-trimethyl-cyclopropyl or 2,2,3,3-tetramethyl-cyclopropyl, cyclobutyl, 3,3-dimethyl-cyclobutyl or 2,2,3-trimethyl-cyclobutyl, cyclopentyl, 2- or 3-methyl-cyclopentyl, 2,5- or 3,4-dimethyl cyclopentyl, cyclohexyl, 2-, 3- or 4-methyl-cyclohexyl, 2,3-, 2,4- or 3,5-dimethyl-cyclohexyl or 2,4,6-trimethyl-cyclohexyl or cycloheptyl; 2-cyclopropenyl, 2,3-dimethyl-2-cyclopropenyl, 1-, 2- or 3-cyclopentenyl or -cyclohexenyl, 2- or 3-methyl-2-cyclopentenyl, 3,4-dimethyl-3-cyclopentenyl or 2-, 3- or 4-methyl-1 or 2-cyclohexenyl.

The phenylene radical Ph, carrying the tertiary amino group

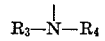

in the 2-, preferably 3- or especially 4-position, is unsubstituted or substituted in the remaining positions by one or more than one, preferably one or two, of the same or different substituents selected, for example, from lower alkyl, e.g. methyl, ethyl, n- or i-propyl or -butyl, free etherified or esterified hydroxy or mercapto, such as lower alkoxy or lower alkylmercapto, e.g. methoxy, ethoxy, n- or i-propoxy or -butoxy, methylmercapto or ethylmercapto, or halogeno, e.g. fluoro, chloro or bromo; trifluoromethyl, nitro, amino, preferably another

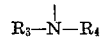

group or lower alkanoylamino, e.g. acetylamino or pivaloylamino, cyano, carbamoyl, di-lower alkyl-carbamoyl, carboxy, lower alkylsulfonyl, sulfo, sulfamoyl or di-lower alkyl-sulfamoyl, e.g. N,N-dimethylcarbamoyl or -sulfamoyl, methyl- or ethylsulfonyl. More particularly, the phenylene radical Ph represents 1,4-phenylene, (lower alkyl)-1,4-phenylene, (lower alkoxy)-1,4-phenylene, mono- or di(halogeno)-1,4-phenylene, (trifluoromethyl)-1,4-phenylene or

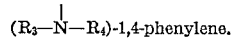

The tertiary amino group

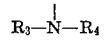

is, for example, N-(lower alkyl, lower alkenyl, lower hydroxyalkyl, or lower alkoxyalkyl)-N-(3 to 7 ring-membered cycloalkyl, cycloalkenyl, cycloalkyl-lower alkyl, cycloalkenyl-lower alkyl or lower aralkyl)-amino, wherein "aryl" preferably represents H-Ph- (exemplified above), e.g. N-(methyl, ethyl, n- or i-propyl, allyl, 2-hydroxyethyl or 2-methoxyethyl)-N-(cyclopropyl, cyclopentyl, cyclohexyl, 3-cyclopentenyl, 2-cyclohexenyl, cyclopropyl-methyl, 2-cyclopentylethyl, 3-cyclopentenylmethyl, benzyl, 1-phenethyl or 2-phenethyl)-amino, but

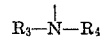

preferably represents mono- or bicyclic lower alkyleneimino [or N-aza-cycloalk(en)yl or -bicycloalk(en)yl respectively], e.g. ethyleneimino, pyrrolidino, 3-pyrrolino, piperidino, 1,4-pentyleneimino, 2,5- or 1,6-hexyleneimino, 2,6- or 1,7-heptyleneimino; 2-aza-2-bicyclo[2,2,1]heptyl, 2-azo-2-bicyclo[2,2,2] or [3,2,1]octyl, 3-azo-3-bicyclo[3,2,1] or [3,3,0]octyl, 2-aza-2-bicyclo[3,2,2] or [3,3,1]nonyl, 3-aza-3-bicyclo[3,2,2] or [3,3,1]nonyl, 2-aza-2-, 3-aza-3-, 7-aza-7- or 8-aza-8-bicyclo[4,3,0]nonyl or 2-aza-2- or 3-aza-3-bicyclo[4,4,0]decyl or monocyclic monoaza-, monooxa- or monothia-lower alkyleneimino or N-(lower alkyl, hydroxylower alkyl, H-Ph-lower alkyl or H-Ph)-monoaza-lower alkyleneimino, wherein 2 heteroatoms are separated by at least 2 carbon atoms, e.g. piperazino, 4-(methyl, ethyl, 2-hydroxyethyl, benzyl or phenyl)-piperazo-1,6-hexyleneimino, 3-(methyl or ethyl)-3-aza-1,6-hexylene-imino, 4-aza-1,7-heptyleneimino or 4-(methyl or ethyl)-4-aza-1,7-heptyleneimino, morpholino, 3,5-dimethylmorpholino or thiamorpholino.

Functional derivatives of the acids of Formula I are preferably their esters, for example, their lower alkyl, lower alkenyl, 3 to 7 ring-membered cycloalkyl, cycloalkenyl, cycloalkyl-lower alkyl or cycloalkenyl-lower alkyl, aryl or aralkyl esters, e.g. the HPh or HPh-lower alkyl esters, free or etherified hydroxy-lower alkyl, e.g. lower alkoxy- or 3 to 7 ring-membered cycloalkoxy-lower alkyl or tert. amino-lower alkyl esters, of which the esterifying moiety has been exemplified above and if it contains hetero atoms, these are separated from each other and the carboxy oxygen by at least 2, preferably 2 or 3 carbon atoms. A tertiary amino group therein is for example

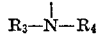

above all lower alkyleneimino, e.g. pyrrolidino or piperidino, or monooxa-, monoaza- or monothia-lower alkyleneimino, such as piperazino, 4-lower alkyl-piperazino, e.g. 4-(methyl or ethyl)-piperazino, morpholino or thiamorpholino. Other functional derivatives of the acids of Formula I are, for example, unsubstituted or substituted amides, e.g. mono- or di-lower alkylamides, lower alkyleneamides, HPh-amides, HPh-lower alkylamides, HPh-thioamides or HPh-lower alkyl thioamides or the nitrile; as well as the N-oxide, lower alkyl- or HPh-lower alkyl quaternaries and salts.

The compounds of the invention possess valuable pharmacological properties. For example, they exhibit anti-inflammatory effects, as can be demonstrated in animal tests, using advantageously mammals, such as rats, as test objects. Such tests can be performed, for example, according to Winter et al., Proc. Soc., Exp. Biol. & Med. 111, 544 (1962). According to it, the compounds of the invention are applied, in the form of aqueous solutions or suspensions, by stomach tube to male and female rats, in the dosage range between about 0.1 and 75 mg./kg./day, preferably between about 0.5 and 50 mg./kg./day, advantageously between about 1 and 25 mg./kg./day. About 1 hour later an aqueous suspension of carrageenin is injected into the rat's paw and any anti-inflammatory activity can be expressed by the reduction of the volume and/or weight of the edematous paw, as compared with the edematous paw volume or weight of untreated, or placebo-treated animals (or comparing the ratios, derived from normal and edematous paw volume or weight, respectively). Besides their above-mentioned utility, the compounds of the invention are also useful as intermediates in the preparation of other valuable products, preferably of pharmacologically active compounds.

Preferred compounds of the invention are those of Formula I in which:

(A) $R_1$ is hydrogen or lower alkyl and $R_2$ is hydrogen, lower alkyl, lower alkenyl or 3 to 7 ring-membered cycloalkyl or cycloalkenyl, Ph is unsubstituted phenylene or phenylene substituted by one or two members selected from the group consisting of lower alkyl, hydroxy, mercapto, lower alkoxy, lower alkylmercapto, halogeno, trifluoromethyl, nitro,

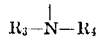

lower alkanoylamino, cyano, carbamoyl, di-lower alkyl-carbamoyl, carboxy, lower alkylsulfonyl, sulfo, sulfamoyl or di-lower alkyl-sulfamoyl, $R_3$ is lower alkyl, $R_4$ is 3 to 7 ring-membered cycloalkyl, cycloalkyl-lower alkyl, or HPh-lower alkyl, or ($R_3$+$R_4$) is mono- or bicyclic lower alkylene, lower alkenylene, lower alkenylene, monocyclic monoaza-, monooxa- or monothia-lower alkylene or N-(lower alkyl, hydroxylower alkyl, HPh-lower alkyl or HPh)-monoaza-lower alkeylene, a lower alkyl ester, lower alkenyl ester, 3 to 7 ring-membered cycloalkyl ester, cycloalkenyl ester, cycloalkyl-lower alkyl ester, cycloalkenyl-lower alkyl ester, HPh-ester, HPh-lower alkyl ester, hydroxylower alkyl ester, lower alkoxy-lower alkyl ester or

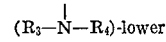

alkyl ester thereof wherein 2 hetero atoms are separated from each other by at least 2 carbon atoms, the amide, thioamide, a mono- or di-lower alkylamide, mono- or di-lower alkyl thioamide, lower alkyleneamide or lower alkylene thioamide, HPh-amide, HPh-thioamide, HPh-lower alkylamide or HPh-lower alkyl thioamide, the nitrile, N-oxide, a lower alkyl quaternary, HPh-lower alkyl quaternary and a therapeutically useful salt thereof;

(B) All the symbols have the meaning give under item (A) but $R_2$ also is 3 to 7 ring-membered cycloalkyl-lower alkyl or cyclo-alkenyl-lower alkyl, $R_3$ also is lower alkenyl, lower hydroxyalkyl or lower alkoxy-lower alkyl, $R_4$ also is 3 to 7 ring-membered cycloalkenyl or cycloalkenyl-lower alkyl and ($R_3$+$R_4$) also is lower alkenylene, as well as the derivatives of these compounds listed under item A.

Particularly useful are the compounds of Formula I, in which $R_1$ is hydrogen and $R_2$ is hydrogen, lower alkyl, 3- to 7-ring-membered cycloalkyl or mono- or di-(lower alkyl)-cycloalkyl, Ph is 1,4-phenylene, (lower alkyl)-1,4-phenylene, (lower alkoxy)-1,4-phenylene, mono- or di-(halogeno)-1,4 - phenylene, (trifluoromethyl)-1,4-phenylene, or (lower alkyleneimino)-1,4-phenylene, the group

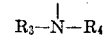

is N-lower alkyl-N-HPh-lower alkylamino or preferably lower alkyleneimino, monoaza-, monooxa- or mono-thia-lower alkyleneimino or N-(lower alkyl, hydroxylower alkyl, HPh-lower alkyl or HPh)-monoaza-lower alkenylene-imino, wherein 2 heteroatoms are separated by at least 2 carbon atoms, a lower alkyl ester, the amide, a mono- or di-lower alkylamide, the ammonium salt, and alkali metal or alkaline earth metal salt or a therapeutically useful acid addition salt thereof.

Preferred compounds of the invention are those of Formula II

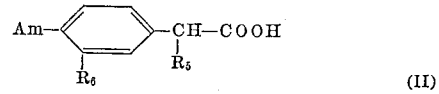

in which Am is lower alkenyleneimino, monoaza-, monooxa- or monothia-lower alkyleneimino wherein 2 heteroatoms are separated by at least 2 carbon atoms, $R_5$ is hydrogen, lower alkyl or 3 to 6 ring-membered cycloalkyl, $R_6$ is hydrogen, lower alkyl, lower alkoxy, halogeno or trifluoromethyl, a lower alkyl ester, the ammonium salt, an alkali metal salt or a therapeutically useful acid addition salt thereof.

Especially valuable are compounds of the Formula II, in which Am is piperidino, morpholino or thiamorpholino, $R_5$ is hydrogen, methyl, ethyl or cyclopropyl and $R_6$ is hydrogen or chloro, the ethyl ester and a therapeutically useful acid addition salt thereof which, when given orally to rats at doses between about 1 and 25 mg./kg./day, show outstanding anti-inflammatory effects.

The compounds of this invention are prepared according to methods known per se. For example, they are obtained by:

(a) converting in a compound of the formula

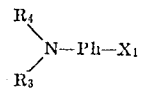

in which $X_1$ is a substituent capable of being converted into the free or functionally converted

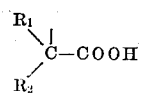

moiety, $X_1$ into said moiety or (b) converting in a compound of the formula

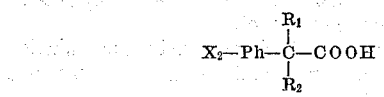

or a functional derivative thereof, in which $X_2$ is a substituent capable of being converted into

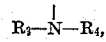

$X_2$ into said tertiary amino group and, if desired, converting any resulting compound into another compound of the invention.

The substituent $X_1$ is, for example, the group

in which Y is an alkali metal, e.g. lithium, halomagnesium or reactively etherified or esterified hydroxy, for example, that derived from a lower alkanol or a strong mineral acid respectively, particularly an ester of a hydrohalic acid, e.g. hydrochloric or hydrobromic acid, a sulfuric or sulfonic acid, such as a lower alkane or benzene sulfonic acid, e.g. methane, ethane or p-toluene sulfonic acid. Such a starting material is reacted with a reactive derivative of carbonic or formic acid, whereby both reactants at most contain one metal atom. The metal or Grignard compound can be reacted with any suitable, metal free carbonic or formic acid derivative, advantageously carbon dioxide, but also a carbonate or haloformate, e.g. diethyl carbonate, ethyl, tert. butyl, allyl, 2-methoxyethyl, 3-chloropropyl, phenyl or benzyl chloroformate, cyanogen or carbamoyl halides, e.g. cyanogen bromide or N,N-diethylcarbamoyl chloride. The reactive esterified hydroxy compound is advantageously reacted with a metal cyanide.

Another substituent $X_1$ is, for example, the group

acetyl, halocarbonyl, or 1-lower alkenyl, wherein Z is an ammonium group or a hydroxy- or boryl-methyl, formyl, 1-lower alkenyl, lower alkenoyl or carboxycarbonyl group. In the first mentioned starting materials Z is converted into carboxy according to standard replacement or oxidation methods. An ammonium group Z, e.g. trimethylammonium, can be replaced, for example, by cyano, upon reacting said starting material with a metal cyanide, e.g. potassium cyanide. The other Z groups can be converted into carboxy, for example, with the use of hydrogen peroxide, heavy metal salts or oxides, e.g. alkali metal chromates or permanganates, chromic or cupric salts, e.g. halides or sulfates, mercuric, manganese or silver oxide, in acidic or alkaline media respectively. In case $X_1$ is acetyl, said group can be oxidized, for example, according to Willgerodt-Kindler with the use of sulfur in the presence of ammonia, primary or secondary amines. In case $X_1$ is halocarbonyl, the starting material is treated according to Arndt-Eistert with a corresponding aliphatic ($R_2$) diazo compound and the diazoketones formed are rearranged by hydrolysis, alcoholysis, ammonolysis or aminolysis. In case $X_1$ is 1-lower alkenyl, such starting material can be reacted with carbon monoxide and water under acidic conditions, for example, in the presence of sulfuric acid.

$X_1$ may also be the free or functionally converted

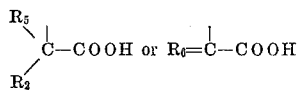

groups, in which $R_5$ is hydroxy or carboxy and $R_6$ is lower alkylidene or cycloalkylidene, which are reduced or decarboxylated according to standard methods, advantageously reduced with the use of catalytically activated or nascent hydrogen, e.g. hydrogen in the presence of nickel, palladium or platinum catalysts, the $\alpha$-hydroxyacids also with phosphorus and iodine, hydroiodic acid or stannous chloride, and decarboxylated by pyrolysis, advantageously in acidic media.

The substituent $X_2$ is, for example, reactively esterified hydroxy, e.g. halogen, advantageously fluorine, which is replaced by the tert. amino group

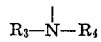

by reacting the corresponding starting material with the secondary amines

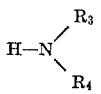

or their alkali metal derivatives.

$X_2$ may also be primary or secondary amino, which is further substituted with the use of corresponding reactively esterified alcohols or glycols, such as lower alkyl, cycloalkyl or aralkyl halides, or lower alkylene, mono-aza-, -oxa- or thia-alkylene dihalides. It may also be substituted by reductive alkylation, i.e. reaction with aliphatic or araliphatic aldehydes or ketones in the presence of reducing agents, e.g. formic acid or its functional derivatives, or catalytically activated hydrogen.

The compounds of the invention so obtained can be converted into each other according to methods known per se. For example, resulting free acids may be esterified with the corresponding alcohols in the presence of a strong acid, e.g. hydrochloric, sulfuric, benzene or p-toluene sulfonic acid, or with diazo compounds, or converted into their halides by treatment with thionyl halides or phosphorus halides or oxyhalides. Resulting esters may be hydrolyzed or transesterified in the presence of acidic or alkaline agents, e.g. mineral or complex heavy metal acids or alkali metal carbonates or alcoholates, or treated with ammonia or corresponding amines. Resulting acid halides may be treated with alcohols, ammonia or amines and resulting metal or ammonium salts with aliphatic or araliphatic halides or chlorosulfite, thionyl halides, phosphorus oxide, halides or oxyhalides or other acyl halides in order to obtain the corresponding esters, halides, anhydrides, amides or the nitrile respectively. Resulting amides or thioamides (Willgerodt) can be hydrolyzed under acidic or alkaline conditions, e.g. with the use of aqueous mineral and/or carboxylic acids or alkali metal hydrides, also alcoholized, transaminated or desulfurized, e.g. with the use of mercuric oxide or alkyl halides followed by hydrolysis. Resulting nitriles likewise can be hydrolyzed or alcoholized, e.g. with the use of concentrated aqueous or alcoholic acids or alkalis or alkaline hydrogen peroxide. A resulting ester, salt or nitrile, containing in $\alpha$-position at least one hydrogen atom, can be metallized therein, e.g. with the use of alkali metal organic compounds, such as phenyl lithium, triphenylmethyl sodium or sodium amides or alcoholates, and thereupon reacted with reactive esters of $R_1$—OH and/or $R_2$—OH. Resulting compounds containing a primary or secondary amino group, can be reacted with a reactive ester of a corresponding alcohol, for example, such mentioned above, or can be acylated, for example, with a reactive functional derivative of a corresponding acid, such as a halide or anhydride thereof, or resulting acyl derivatives may be split, for example, with the use of acidic or alkaline hydrolyzing agents, or phathaloyl compounds by hydrazinolysis. Resulting unsaturated compounds can be hydrogenated by the controlled uptake of catalytically activated hydrogen, in order to eliminate double bonds, e.g. in the $R_2$-group and/or ester moiety.

A resulting acid can be converted into its salts according to conventional methods, for example, by reacting it with an about stoichiometric amount of a suitable salt-forming reagent, such as ammonia, an amine or an alkali or alkaline earth metal hydroxide, carbonate or hydrogen carbonate. A salt of this type can be reconverted into the free acid by treatment with an acid, e.g. hydrochloric, sulfuric or acetic acid until the proper pH has been reached. A resulting compound can be converted into a corresponding acid addition salt, for example by reacting it with an inorganic acid or organic acid such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, or organic acids, e.g. carboxylic or sulfonic acids, such as formic, acetic, proponic, succinic, glycollic, lactic, malic, tartaric, citric, ascorbic, maleic, hydroxymaleic, pyroracemic, phenylaceitc, benzoic, 4-aminobenzoic, anthranilic, 4-hydroxy benzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l-tartratess or d-α-(1-naphthyl)-ethylamine or l-cinchonidine salts.

The above reactions are carried out according to standard methods, in the presence or absence of diluents, preferably such as are inert to the reagents and are solvents thereof, of catalysts, condensing or neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those compounds of the invention, which are indicated above as the preferred embodiments of the invention.

The starting material used is known or, if new, may be prepared according to methods known per se. For example, the starting material mentioned under item (a) is prepared from compounds of the formula

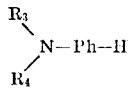

according to Friedel-Crafts, e.g. with the use of $R_2$—COCl, hydrogen chloride and formaldehyde or phosgene and aluminum chloride. The resulting ketones or acyl halides are either used as such in the above-mentioned Willgerodt-Kindler or Arndt-Eistert reactions, or the ketones are reduced to the corresponding alcohols, advantageously with the use of an $R_1$-Grignard compound or sodium borohydride. The resulting alcohols can be reactively esterified, e.g. with thionyl or sulfonyl halides and, if desired, the resulting esters etherified and/or metallized, e.g. with the use of lower alkoxides, magnesium, zinc, mercury and/or alkali metals and, if desired, Grignard compounds, in order to obtain the starting material containing Y. That, containing Z can be obtained by reacting the above metal derivatives with formyl or oxalyl halides, by the reaction of said ketones Am—Ph—CO—$R_2$ with $R_1$-halomagnesium compounds followed by dehydration, or by the dehydration of those alcohols containing the

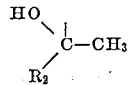

moiety, for example, with sulfuric acid and boranation or hydration of the resulting methylidene compound, e.g. its reaction with boranes or diluted mineral acids and, if desired, traces of peroxides, e.g. benzoyl peroxide. Finally, the starting material containing the free or functionally converted

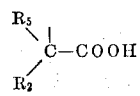

or

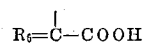

group can be obtained according to Friedel-Crafts with the use of

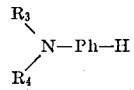

and oxalyl halides and reduction of the resulting phenyl-glyoxylic acid ester with $R_2$-Grignard compounds, if desired, followed by dehydration, or according to the Ando synthesis by the addition of mesoxalates to the tert. anilines in the presence of stannic chloride. The resulting adduct can either be hydrogenated, the malonate formed metallized and reacted with a reactive ester of $R_2$—OH or saponified and decarboxylated. The corresponding nitriles can also be obtained from the Friedel-Crafts ketones according to the cyanohydrin synthesis.

The starting materials mentioned under item (b) are prepared analogous to reaction (a). The intermediates so obtained, can also be converted into each other, as shown for the final products.

The pharmaceutically active compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums alginic acid, benzyl alcohols, glycols, and other known excipients. The compositions may be, for example, in solid form as tablets, dragees or capsules, or in liquid form as solutions, suspensions or emulsion. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

EXAMPLE 1

The mixture of 8.53 g. 4-piperidino-acetophenone, 7.5 g. sulfur, 6 ml. pyridine and 10 ml. saturated aqueous ammonia is heated in a sealed tube to 165° for 5 hours. After cooling, it is poured into water, the mixture boiled with charcoal and filtered hot. The filtrate is concentrated in vacuo and the precipitate formed after cooling is filtered off and recrystallized from ethanol, to yield the (4-piperidino-phenyl)-acetamide of the formula

melting at 172–175°.

The starting material is prepared as follows: The mixture of 202 g. 4-fluoro-acetophenone, 255 g. piperidine and 450 ml. dimethylsulfoxide is heated at the steam cone for 48 hours. After cooling it is poured into ice water, the precipitate formed filtered off and recrystallized from hexane, to yield the 2-piperidino-acetophenone melting at 85–86°.

EXAMPLE 2

The mixture of 4.5 g. 4-piperidino-acetophenone, 200 ml. morpholine, 8.5 g. sulfur and 2 g. p-toluene sulfonic acid is refluxed for 17 hours while stirring. It is evaporated in vacuo and the residue recrystallized from ethanol, to yield the (4)-piperidino-phenyl)-thioacetmorpholid of the formula

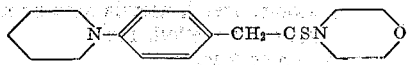

melting at 156–158°.

By concentrating the mother liquor, another precipitate is formed, which is filtered off and recrystallized from isopropanol, to yield a small amount of (4-piperidino-phenyl)-monothioglyoxylic acid morpholid melting at 140–144°.

Example 3

To the solution of 10 g. (4-piperidino-phenyl)-thioacetmorpholid in 300 ml. acetone, 25 ml. methyl iodide are added dropwise while stirring and the mixture is refluxed for 3½ hours. It is cooled, filtered, and the residue dissolved in the minimum amount of morpholine. The solution is heated at the steam bath until the evolution of methylmercaptan ceases. It is evaporated in vacuo, the residue taken up in water and the mixture heated at the steam cone for 10 minutes. It is cooled, extracted with chloroform, the extract dried, filtered and evaporated. The residue is recrystallized from diethyl etherhexane, to yield the (4-piperidino-phenyl)-acetmorpholid of the formula

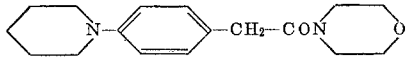

melting at 99–103°.

Example 4

The mixture of 42 g. (4-piperidino-phenyl)thioacetmorpholid and 250 ml. concentrated hydrochloric acid is slowly heated to reflux and refluxed for 3 hours. It is evaporated in vacuo, the residue triturated with chloroform and recrystallized from isopropanol, to yield the (4-piperidino-phenyl)acetic acid hydrochloride of the formula

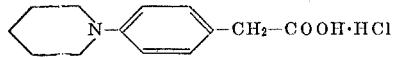

melting at 189–193°.

Example 5

The mixture of 30 g. (4-piperidino-phenyl)-acetic acid hydrochloride and 100 ml. saturated ethanolic hydrochloric acid is refluxed for 17 hours and evaporated in vacuo. The residue is taken up in water, the mixture washed with diethyl ether, the aqueous layer separated and made basic with aqueous sodium hydroxide. The mixture is extracted with diethyl ether, the extract dried and gassed with hydrogen chloride. The precipitate formed is filtered off, to yield the ethyl (4-piperidino-phenyl)-acetate hydrochloride of the formula

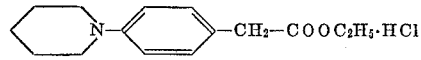

melting at 160–162°.

Example 6

The solution of 14.2 g. ethyl (4-piperidino-phenyl)-acetate hydrochloride in the minimum amount of water is made basic with aqueous sodium hydroxide and extracted with diethyl ether. The extract is dried, filtered, the filtrate concentrated to 15 ml. and added dropwise to the solution of 20 g. sodium amide in 350 ml. liquid ammonia while stirring. Hereupon the solution of 7.1 g. methyl iodide in 25 ml. diethyl ether is added dropwise during 25 minutes and the mixture stirred for 1½ hours. Hereupon water and diethyl ether are added and the mixture allowed to stand overnight. The organic phase is separated, the aqueous layer extracted with diethyl ether, the combined organic solutions dried, filtered and the filtrate gassed with hydrogen chloride. The precipitate formed is filtered off and recrystallized from acetone, to yield the ethyl α-(4-piperidino-phenyl)-propionate hydrochloride of the formula

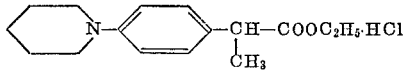

melting at 190–192°.

Example 7

The mixture of 70 g. 4-pyrrolidino-acetophenone, 250 ml. morpholine, 13.5 g. sulfur and 3 g. p-toluene sulfonic acid is refluxed for 17 hours while stirring. It is evaporated in vacuo and the residue recrystallized from ethanol to yield the (4-pyrrolidino-phenyl)-thioacetmorpholid of the formula

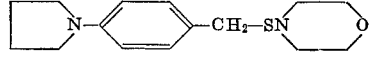

Example 8

The mixture of 50 g. 4-morpholino-acetophenone, 9 g. sulfur and 2.5 g. p-toluene sulfonic acid is refluxed for 15 hours. It is concentrated in vacuo and the residue recrystallized from acetone to yield the (4-morpholino-phenyl)-thioacetorpholid of the formula

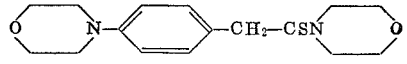

melting at 164–166°.

Example 9

The mixture of 32.9 g. methyl (4-amino-phenyl)-acetate, 48 g. 1,5-dibromo-pentane, 54 g. N,N-diisopropyl-N-ethylamine and 100 ml. methylene chloride is allowed to stand for 2½ days at room temperature and is finally refluxed for 6 hours. After cooling, 200 ml. toluene are added, the mixture filtered and the filtrate evaporated in vacuo. The residue is chromatographed on 200 g. silica gel and eluated with toluene. The first fractions are collected and evaporated, to yield the methyl (4-piperidino-phenyl)-acetate of the formula

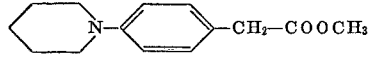

having an Rf value of 0.61 in the thin layer chromatogram using silica gel as the stationary phase and benzene: acetone (9:1) as the mobile phase.

After acidic saponification, analogous to the method described in Example 4, the corresponding free acid hydrochloride is obtained, which is identical with the product of that example.

Example 10

The mixture of 5 g. ethyl α-(4-piperidino-phenyl)-propionate hydrochloride and 100 ml. 25% aqueous sodium hydroxide is refluxed until dissolution is complete. It is cooled, acidified with hydrochloric acid and evaporated in vacuo. The residue is taken up in ethanol, the solution treated with charcoal, filtered and the filtrate evaporated. The residue is recrystallized from isopropanol-diethyl ether, to yield the α-(4-piperidino-phenyl)-propionic acid hydrochloride of the formula

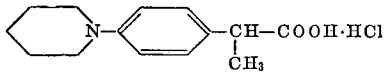

melting at 211–214°.

Example 11

The mixture of 72 g. (4-morpholino-phenyl)-thioacetmorpholid and 200 ml. concentrated hydrochloric acid is refluxed for 2 hours and allowed to stand overnight at room temperature. It is evaporated in vacuo, the residue taken up in 100 ml. water and the solution neutralized with N-aqueous sodium bicarbonate to a pH of 3–4. The precipitate formed is filtered off and recrystallized from ethanol-diethyl ether, to yield the (4-morpholino-phenyl)-acetic acid of the formula

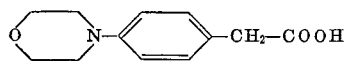

melting at 111–113°.

Example 12

In the manner described in the previous examples, the following compounds are prepared:

(Ia) (4-hexamethyleneimino-phenyl)-thioacetmorpholid, M.P. 127–129°, (b) (4-hexamethyleneimino-phenyl)-acetic acid hydrochloride, M.P. 148–151°.

(IIa) (4-heptamethyleneimino-phenyl)-thioacetmorpholid, M.P. 122–124°.

Example 13

To the solution of 8 g. (3-chloro-4-morpholino-phenyl)-acetonitrile in 100 ml. ethanol, 4 g. potassium hydroxide in 40 ml. water are added and the whole is refluxed for 16 hours. The mixture is evaporated in vacuo, the residue is taken up in 150 ml. water, 0.5 g. charcoal are added and the mixture is filtered. The filtrate is acidified with 2 N hydrochloric acid to a pH of about 3 and extracted with diethyl ether. The extract is washed with water, dried, evaporated and the residue recrystallized from diethyl ether-petroleum ether, to yield the 3-(chloro-4-morpholino-phenyl)-acetic acid of the formula

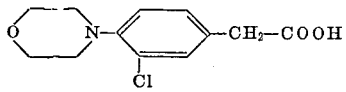

melting at 125–126°.

The starting material is prepared as follows: The mixture of 200 g. 3-nitro-4-chloro-benzoic acid and 400 ml. morpholine is heated to 140° for 5 hours and evaporated in vacuo. The residue is taken up in 4 liters water and 1.5 liter ethanol, and the mixture acidified with 2 N hydrochloric acid to a pH of about 3. The precipitate formed is filtered off and recrystallized from ethanol, to yield the 3-nitro-4-morpholino-benzoic acid melting at 175–176°.

The mixture of 80 g. thereof, 500 ml. methanol and 30 ml. concentrated sulfuric acid is refluxed for 3 hours and evaporated in vacuo. The residue is taken up in water, the mixture made slightly basic with sodium hydroxide and extracted with ethyl acetate. The extract is washed with water, dried, evaporated in vacuo and the residue recrystallized from diethyl ether-petroleum ether, to yield the methyl 3-nitro-4-morpholino-benzoate melting at 97–99°.

The mixture of 96.5 g. thereof, 500 ml. ethanol and 5 g. 10% palladium charcoal is hydrogenated until the theoretical amount of hydrogen is absorbed (about 6 hours). The mixture is diluted with 500 ml. dimethyl-formamide, heated to the boil and filtered. The filtrate is concentrated in vacuo to about ⅔ of the original volume, cooled, and the precipitate formed filtered off, to yield the methyl 3-amino-4-morpholino-benzoate melting at 189–191°.

The mixture of 82 g. thereof, 500 ml. ethanol, 60 ml. 10 N aqueous sodium hydroxide and 200 ml. water is heated at the steam bath for 3 hours. Hereupon 1 g. charcoal is added, the mixture filtered hot, the filtrate cooled and acidified with concentrated hydrochloric acid to a pH of 3–4. The precipitate formed is filtered off, to yield the 3-amino-4-morpholino-benzoic acid melting at 250–252° with decomposition.

To the mixture of 110 g. thereof and 700 ml. concentrated hydrochloric acid, the solution of 50 g. sodium nitrite in 200 ml. water is added dropwise at 0° while stirring. The solution obtained is added slowly to the stirred solution of 80 g. freshly prepared cuprous chloride in 300 ml. concentrated hydrochloric acid while cooling to keep the temperature between about 10 and 15°. The mixture is stirred for 1 hour at room temperature and is diluted with water. The precipitate formed is filtered off, dissolved in aqueous sodium bicarbonate and the solution treated with charcoal. It is filtered, the filtrate acidified with hydrochloric acid to a pH of 3–4, the precipitate formed filtered off and recrystallized from ethanol, to yield the 3-chloro-4-morpholino-benzoic acid melting at 195–196°.

The mixture of 38 g. thereof, 250 ml. ethanol and 17 ml. concentrated sulfuric acid is refluxed for 1 hour and evaporated in vacuo. To the residue, ice and saturated aqueous potassium carbonate is added until alkaline, and the whole is extracted with diethyl ether. The extract is dried, evaporated and the residue recrystallized from diethyl ether-petroleum ether, to yield the ethyl 3-chloro-4-morpholino-benzoate melting at 75–76°.

The solution of 30 g. thereof in 50 ml. dioxane is added dropwise to the suspension of 5 g. lithium aluminum hydride in 450 ml. dioxane at 70° while stirring, and stirring is continued for ½ hour. The mixture is cooled, carefully diluted with water, filtered, the residue washed with dioxane and the filtrate evaporated in vacuo. The residue is taken up in diethyl ether, the solution shaken with charcoal, filtered, the filtrate evaporated and the residue recrystallized from diethyl ether-petroleum ether, to yield the 3-chloro-4-morpholino-benzyl alcohol melting at 80–81°.

The mixture of 17 g. thereof, 200 ml. benzene and 20 g. thionyl chloride is refluxed for 4 hours, cooled and filtered. The filtrate is evaporated in vacuo, the residue taken up in ice water and extracted with diethyl ether. The extract is washed with aqueous sodium bicarbonate, dried, filtered and evaporated. The residue is recrystallized from petroleum ether, to yield the 3-chloro-4-morpholino-benzyl chloride melting at 58–60°.

The solution of 5 g. thereof in 10 ml. dimethylsulfoxide is added dropwise to the suspension of 2.5 g. vacuum-dried sodium cyanide in 50 ml. dimethylsulfoxide while stirring, whereby the temperature is rising to 40°. The mixture is stirred for ½ hour at 60°, cooled, diluted with 250 ml. ice water and extracted with ethyl acetate-diethyl ether (1:1). The extract is dried, evaporated in vacuo and the residue recrystallized from petroleum ether, to yield the (3-chloro-4-morpholino-phenyl)-acetonitrile melting at 124–126°.

In the analogous manner the following intermediates are prepared: 3-nitro-4-piperidino-benzoic acid M.P. 198–201°, 3-amino-4-piperidino-benzoic acid M.P. 180°, 3-chloro-4-piperidino-benzoic acid M.P. 165–167°, its ethyl ester M.P. 48–49° or B.P. 130°/0.1 mm. Hg, 3-chloro-4-piperidino-benzyl alcohol B.P. 130°/0.2 mm. Hg, 3-chloro-4-piperidino-benzyl chloride and (3-chloro-4-piperidino-phenyl)-acetonitrile M.P. 55–56°.

Example 14

To the solution of (3-chloro-4-piperidino-phenyl)-aceto-nitrile in 150 ml. ethylene glycol, 5 g. potassium hydroxide in 30 ml. water are added and the mixture heated for 18 hours to 130–140°. It is cooled, diluted with 400 ml. water, acidified with 2 N hydrochloric acid to a pH of about 3 and extracted with diethyl ether. The extract is shaken with saturated aqueous sodium bicarbonate and the aqueous layer acidified with 2 N hydrochloric acid to a pH of about 3. It is extracted with diethyl ether, the extract dried, evaporated and the residue recrystallized from diethyl ether-petroleum ether, to yield the (3-chloro-4-piperidino-phenyl)acetic acid of the formula

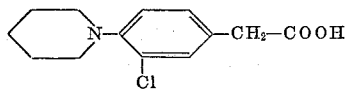

melting at 106–107°.

Example 15

The mixture of 8.8 g. methyl(3-amino-phenyl)-acetate, 25.2 g. 1,5-dibromo-pentane, 13.8 g. diisopropyl-ethylamine and 40 ml. ethanol is refluxed overnight and the ethanol removed by distillation. The residue is taken up in diethyl ether, the solution extracted with 4 N hydrochloric acid, the extract cooled and made basic with 20% aqueous sodium hydroxide. It is extracted with diethyl ether, the extract washed with water, dried and evaporated. The residue is distilled and the fraction boiling at 105–115° collected, to yield the methyl (3-piperidino-phenyl)-acetate of the formula

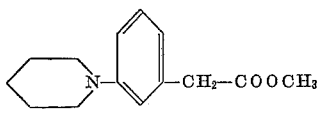

The solution of 6.28 g. thereof in 50 ml. 6 N hydrochloric acid is refluxed for 3 hours and evaporated in vacuo. The residue is recrystallized from water to yield the (3-piperidino-phenyl)-acetic acid hydrochloride melting at 242–245°.

Example 16

The mixture of 25 g. ethyl (3-chloro-4-amino-phenyl)-acetate hydrochloride, 46 g. 1,5-dibromo-pentane, 65 g. diisopropylethylamine and 300 ml. dimethylformamide is heated for 30 hours to 100° and evaporated in vacuo. The residue is taken up in diethyl ether, the solution filtered, the filtrate washed with water and extracted with 2 N hydrochloric acid. The acidic solution is neutralized with aqueous sodium hydroxide and extracted with diethyl ether. The extract is evaporated, the residue heated with 300 ml. 6 N hydrochloric acid for 16 hours to 100° and the mixture evaporated in vacuo. The residue is recrystallized from methanol-diethyl ether to yield the (3-chloro-4 - piperidino-phenyl) - acetic acid hydrochloride melting at 205–208°. The corresponding free acid resulting from an aqueous solution at a pH of about 3–4 is identical with the compound obtained according to Example 14.

The starting material is prepared as follows: The mixture of 100 g. (4-amino-phenyl)-acetic acid and 200 ml. acetanhydride is heated at the steam cone for 15 minutes and evaporated. The residue is stirred with 500 ml. hot water until complete dissolution occurs. The solution is cooled and the precipitate formed filtered off, to yield the (4-acetamino-phenyl)-acetic acid melting at 168–170°.

Into the solution of 77 g. thereof in 400 ml. glacial acetic acid, a slow stream of chlorine is bubbled at 50° until the spot of the starting material has disappeared in the thin layer chromatogram (4 ml. chloroform-ethyl acetate 1:1 and 4 drops formic acid). The mixture is cooled, the precipitate filtered off to yield the crude (3-chloro-4-acetamino-phenyl)-acetic acid.

The mixture of 69 g. thereof and 400 ml. saturated ethanolic hydrochloric acid is refluxed for 3 hours and cooled. The precipitate formed is filtered off and washed with ethanol to yield the ethyl (3 - chloro - 4 - amino-phenyl)-acetate hydrochloride melting at 167–168°.

Example 17

The mixture of 20 g. ethyl (3 - chloro - 4 - amino-phenyl)-acetate hydrochloride, 34.6 g. 1,4 - dibromo-butane, 52 g. diisopropylethylamine and 300 ml. dimethylformamide is heated for 40 hours to 100° and evaporated in vacuo. The residue is taken up in diethyl ether, the solution filtered, the filtrate washed with water and extracted with 2 N hydrochloric acid. The aqueous solution is neutralized with aqueous sodium hydroxide, extracted with diethyl ether and the extract evaporated. The residue is taken up in 300 ml. 6 N hydrochloric acid and the mixture heated for 16 hours to 100°. It is evaporated in vacuo and the residue recrystallized from methanol-diethyl ether, to yield the (3 - chloro - 4 - pyrrolidino-phenyl)-acetic acid hydrochloride of the formula

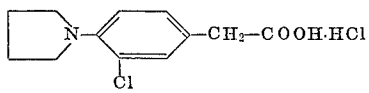

melting at 194–196°.

Example 18

The mixture of 35.8 g. ethyl (4 - amino - phenyl)-acetate, 600 ml. dimethylformamide, 86.4 g. 1,4-dibromo-butane and 156 g. diisopropyl-ethylamine is heated at the steam bath for 45 hours and evaporated under reduced pressure. The residue is taken up in water, the mixture extracted with diethyl ether and the extract washed with 2 N hydrochloric acid. The aqueous solution is made strongly basic with aqueous sodium hydroxide and the mixture refluxed until dissolution is complete. It is cooled, washed with diethyl ether, the aqueous layer slowly acidified with 2 N hydrochloric acid to a pH of about 4–5 and extracted with diethyl ether. The extract is dried, concentrated, the concentrate diluted with petroleum ether and the precipitate formed filtered off to yield the (4-pyrrolidino-phenyl)-acetic acid of the formula

melting at 138–141°.

Example 19

To the mixture of 4.37 g. sodium amide and 500 ml. liquid ammonia, 20 g. ethyl (4 - pyrrolidino - phenyl)-acetate are slowly added while stirring, followed by the dropwise addition of 14.04 g. methyl iodide. The mixture is stirred for 2 hours and evaporated. The residue is taken up in 200 ml. ice cold 20% phosphoric acid, the mixture made basic with sodium hydroxide to a pH of 8–9 and extracted with diethyl ether. The extract is dried and evaporated to yield the ethyl α - (4 - pyrrolidino-phenyl)-propionate.

The mixture of 15 g. thereof and 200 ml. 25% potassium hydroxide is heated for 1 hour to 100°. It is cooled, acidified with hydrochloric acid to a pH of 4–5, the mixture extracted with diethyl ether, the extract dried and concentrated. To the hot concentrate petroleum ether is added until turbid and the precipitate formed in the cold filtered off, to yield the α - (4 - pyrrolidinophenyl)-propionic acid of the formula

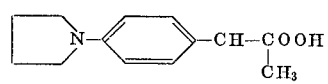

melting at 142°.

Example 20

The mixture of 100 g. 4 - hexamethyleneimino - aceto-phenone, 300 ml. morpholine, 25 g. sulfur and 2 g. p-toluene sulfonic acid is refluxed overnight while stirring. It is concentrated under reduced pressure to about half of its original volume, the concentrate cooled and poured into 500 ml. methanol. The mixture is kept overnight in the refrigerator, filtered and the residue recrystallized from methanol, to yield the (4 - hexamethyleneimino-phenyl)-thioacetmorpholid melting at 129°.

The mixture of 100 g. thereof and 500 ml. 25% potassium hydroxide in ethylene glycol-water (1:2) is refluxed until homogeneous. It is filtered, the filtrate washed with diethyl ether, the aqueous solution acidified with 2 N hydrochloric acid and again washed with diethyl ether. To the aqueous layer di-potassium hydrogen phosphate is slowly added until the pH is 4.5 and the whole is extracted with diethyl ether. The extract is dried, concentrated, and the concentrate diluted with petroleum ether, to yield the (4 - hexamethyleneimino- phenyl) - acetic acid of the formula

melting at 100–102°.

Example 21

Preparation of 10,000 tablets each containing 50.0 mg. of the active ingredient:

Formula:

| | G. |
|---|---|
| Ethyl α - (4 - piperidino-phenyl)propionate hydrochloride | 500.00 |
| Lactose | 1,706.00 |
| Corn starch | 90.00 |
| Polyethylene glycol 6,000 | 90.00 |
| Talcum powder | 90.00 |
| Magnesium stearate | 24.00 |
| Purified water, q.s. | |

Procedure:

All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35° broken on a screen with 1.2 mm. openings and compressed into tablets using concave punches with 7.1 mm. diameter, uppers bisected.

We claim:

1. The α-(tert. aminophenyl)-aliphatic acid having the formula

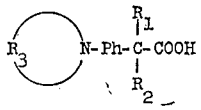

in which $R_1$ is hydrogen or lower alkyl, $R_2$ is hydrogen, lower alkyl or lower alkenyl, Ph is unsubstituted 1,3- or 1,4-phenylene, and the group $R_3\!\!\underset{\smile}{\frown}\!\!N-$ is monocyclic loweralkyleneimino or or a lower alkyl ester, the amide, a mono- or lower alkylamide, the ammonium salt, an alkali metal or alkaline earth metal salt or a therapeutically useful acid addition salt thereof.

2. A compound as claimed in claim 1, in which formula $R_1$ is hydrogen, $R_2$ is hydrogen or lower alkyl, Ph is 1,3- or 1,4-phenylene and the group

is monocyclic lower alkyleneimino, or a lower alkyl ester, the amide, a mono- or dilower alkylamide, the ammonium salt, an alkali metal or alkaline earth metal salt or a therapeutically useful acid addition salt thereof.

3. A compound as claimed in claim 1 and having the formula

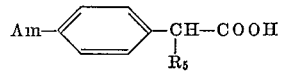

in which Am is monocyclic lower alkyleneimino, $R_5$ is hydrogen, or lower alkyl, or a lower alkyl ester, the ammonium salt, an alkali metal salt or a therapeutically useful acid addition salt thereof.

4. A compound as claimed in claim 3, in which formula Am is piperidino, $R_5$ is hydrogen, methyl or ethyl or the ethyl ester or a therapeutically useful acid addition salt thereof.

5. A compound as claimed in claim 3 and being the (4-piperidino-phenyl)-acetic acid, the methyl ester, ethyl ester, amide or hydrochloride thereof.

6. A compound as claimed in claim 3 and being the α-(4-piperidino-phenyl)-propionic acid, the ethyl ester or the hydrochloride thereof.

7. A compound as claimed in claim 3 and being the (4-hexamethyleneimino-phenyl)-acetic acid or the hydrochloride thereof.

8. A compound as claimed in claim 4 and being the (4-pyrrolidino-phenyl)-acetic acid, the ethyl ester or hydrochloride thereof.

9. A compound as claimed in claim 4 and being the α-(4-pyrrolidino-phenyl)-propionic acid or the ethyl ester thereof.

10. A compound as claimed in claim 2 and being the (3-piperidino-phenyl) acetic acid, the methyl ester or hydrochloride thereof.

References Cited

UNITED STATES PATENTS

| 1,915,334 | 6/1933 | Salzberg et al. | 260—243 |
| 2,075,359 | 3/1937 | Salzberg et al. | 424—250 |

OTHER REFERENCES

Norman et al., J. Chem. Soc. (1963) pt. 5, p. 5435.
Broser et al. Chem, Abs. 65-8815d (1966).
Zen et al., Chem. Abs. 59-13962 f (1963).

JOSEPH A. NARCAVAGE, Assistant Examiner

U.S. Cl. X.R.

260—239 E, 239 BA, 239 BC 243 B, 247.1, 247.2 R 247.2 A, 247.2 B, 268 PH, 293.73, 293.77, 293.74, 293.81, 293.82, 326.3

PO-1050
(5/69)

UNITED STATES PATENT OFFICE
CERTIFICATE OF CORRECTION

Patent No. 3,657,230          Dated April 18, 1972

Inventor(s) RICHARD WILLIAM JAMES CARNEY ET AL

It is certified that error appears in the above-identified patent and that said Letters Patent are hereby corrected as shown below:

Column 1, line 6, delete "Ciba Corporation, Summit, New Jersey" and insert --- CIBA-GEIGY Corporation, Ardsley, New York ---.

Column 15, claim 1, line 59, after "mono- or" insert --- di- ---.

Column 16, claim 8, line 36, after "claim" delete "4" and insert --- 3 ---.

Column 16, claim 9, line 39, after "claim" delete "4" and insert --- 3 ---.

Signed and sealed this 20th day of August 1974.

(SEAL)
Attest:

McCOY M. GIBSON, JR.
Attesting Officer

C. MARSHALL DANN
Commissioner of Patents